(12) United States Patent
Kim et al.

(10) Patent No.: US 8,316,693 B2
(45) Date of Patent: Nov. 27, 2012

(54) SURFACE ANALYSIS AND MEASUREMENT METHOD BASED ON FLOW RESISTANCE OF FLUID AND ATOMIC FORCE MICROSCOPE USING THE METHOD

(75) Inventors: Sung Jin Kim, Daejeon (KR); Tae Young Kim, Incheon (KR); Dong Kwon Kim, Seoul (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 306 days.

(21) Appl. No.: 12/625,998

(22) Filed: Nov. 25, 2009

(65) Prior Publication Data

US 2010/0132077 A1 May 27, 2010

(30) Foreign Application Priority Data

Nov. 27, 2008 (KR) ........................ 10-2008-0119103

(51) Int. Cl.
*G01B 13/16* (2006.01)
(52) U.S. Cl. ........................................ 73/37.5; 118/712
(58) Field of Classification Search ................... 73/37.5; 118/712
See application file for complete search history.

(56) References Cited

U.S. PATENT DOCUMENTS

| 3,802,086 | A | * | 4/1974 | Walker | 73/37.5 |
| 4,607,525 | A | * | 8/1986 | Turner et al. | 73/37.5 |
| 5,789,661 | A | * | 8/1998 | Fauque et al. | 73/37.5 |

FOREIGN PATENT DOCUMENTS

| KR | 102005-0043885 A | 5/2005 |
| KR | 102006-0080353 A | 7/2006 |
| KR | 102006-7007859 A | 12/2006 |

\* cited by examiner

*Primary Examiner* — Jack Berman
(74) *Attorney, Agent, or Firm* — Sughrue Mion, PLLC

(57) ABSTRACT

Provided is a surface analysis and measurement method based on the flow resistance of a fluid. The method comprises: spraying a fluid on the surface of a sample; identifying and determining if a flow resistance value of the fluid colliding with the sample surface is optimal for the measurement of the surface topography of the sample; setting the determined optimal flow resistance value to a reference value and moving the sample in the X-Y axes to allow the entire surface of the sample to be scanned; varying the position of the sample in the Z axis together with the X-Y axis movement to adjust varying flow resistance values of the fluid along the irregular surface topography of the sample to the set flow resistance value during scanning; and expressing the movement ranges of the sample in the X, Y and Z axes as numerical values and representing the numerical values as brightness values on a computer screen to display the surface topography of the sample. Further provided is an atomic force microscope using the method.

7 Claims, 8 Drawing Sheets

Cut of distance (a)

(b)          (c)

SURFACE ANALYSIS AND MEASUREMENT METHOD BASED ON FLOW RESISTANCE OF FLUID AND ATOMIC FORCE MICROSCOPE USING THE METHOD

BACKGROUND OF THE INVENTION

1. Field of the Invention

The present invention relates to a surface analysis and measurement method based on the flow resistance of a fluid, and an atomic force microscope using the method. More specifically, the present invention relates to a method for precisely analyzing and measuring the surface of a nanometer-sized sample by utilizing flow resistance resulting from a flow of a fluid, and an atomic force microscope using the method.

2. Description of the Related Art

SPM is an abbreviation for scanning probe microscope and is a generic term for a new concept of microscope capable of measuring the surface characteristics of materials at the atomic level. In Korea, SPM is simply called an atomic microscope. SPM has overcome the generally accepted truth that atoms are too small (0.1-0.5 nm) to be seen even with the aid of very advanced microscopes. Optical microscopes, scanning electron microscopes (SEMs) and scanning probe microscopes are considered as belonging to the first, second and third generation microscopes, respectively. Optical microscopes have a maximum magnification of thousands of times and the scanning electron microscopes have a maximum magnification of tens of thousands of times, while scanning probe microscopes have a maximum magnification of tens of millions of times, which is sufficient to observe individual atoms. Transmission electron microscopes (TEMs) have a horizontal resolution on the atomic scale, but they have too low a vertical resolution to observe individual atoms. In contrast, scanning probe microscopes have a higher vertical resolution than their horizontal resolution, thus enabling the observation of samples smaller than 0.01 nm corresponding to one tenths of the diameter of atoms.

FIG. 1 illustrates a system of a prior art atomic force microscope based on the SPM principle.

The atomic force microscope (AFM) is an instrument for measuring the surface topography of a sample by using a tiny bar, called a cantilever. The cantilever has a structure in which a cantilever probe having a size as small as a few nm is formed on one end of a cantilever body.

When the probe approaches the surface of the sample, attractive and repulsive forces act between atoms of the probe tip and atoms of the sample surface depending on the distances between the probe tip and the sample surface. The degree of bending of the cantilever by the forces represents the surface topography of the sample. This is the basic principle of the atomic force microscope.

Atomic force microscopes are divided into two modes, i.e. contact mode and non-contact mode, depending on whether they utilize a repulsive force or an attractive force. Particularly, the non-contact mode atomic force microscope measures the topography of a sample by using a force gradient rather than by using a direct force in a state in which a probe is relatively spaced away from the sample. Accordingly, the actual force applied to the sample in the non-contact mode atomic force microscope is much smaller than the repulsive force in the contact mode atomic force microscope, thus enabling the measurement of soft samples susceptible to damage. The topology measurement of a sample using atomic forces is done by reading coordinates of moments when changes of a cantilever including a probe due to the atomic forces can be detected as the cantilever approaches the sample.

A scanning probe microscope is an instrument by which various characteristics (e.g., surface topography) of a sample can be measured and analyzed by moving a tiny probe close to the sample to induce interactions between the sample and the probe tip.

Scanning probe microscopes are currently realized in various forms depending on their measurement principles.

An atomic force microscope (AFM), known as the most common scanning probe microscope, includes a small-sized bar (10 µm×1 µm), called a cantilever, and a probe disposed at a distal end of the cantilever. These elements are made by micro-machining.

The probe is made by the following procedure. First, a thin tungsten filament is electrochemically etched to make a tip sharp. Only a few atoms only are left on the distal end of the tip. This sharp needle is made very sensitive in the presence of a strong electric field at a high temperature. Finally, an oxide layer formed during etching is removed from the tungsten filament.

When an appropriate voltage is applied between the probe tip and a conductor sample in a state in which the probe is spaced a distance of 0.5 nm, which corresponds to the size of one or two atoms, from the sample surface, electrons penetrate and pass through the energy battier between the probe and the sample. As a result, a current flows between the probe and the sample ("quantum mechanical tunneling"). This phenomenon takes place because the two conductors are very close to each other. A long distance between the probe and the sample drastically decreases the possibility of electron tunneling, leading to a marked reduction in the amount of current.

The probe is moved up, down, right and left by the action of a scanner made of a piezoelectric ceramic. The scanner has a precision of at least 0.01 nm.

The probe scans right, left, forward and backward along the sample surface while adjusting its height so as to allow the current to flow at a constant rate. At this time, the upward and downward movement distances of the probe at given points are recorded and represented as brightness values on a computer screen. This image represents the topography of the sample. Data from the image include flatness, a sectional diagram and a three-dimensional diagram of each portion of the sample and other statistical data, as well as a top diagram of the sample.

However, a problem of the prior art atomic force microscope is that the probe mechanically moves along the sample surface, which renders the imaging speed slower than that of an optical microscope or an electron microscope.

Further, a flexible size of the probe makes it difficult or impossible to measure steeply inclined surface portions like narrow and deep valleys.

Moreover, convolution effect due to the shape of the probe causes measurement errors even in measurable portions of the sample. Furthermore, the atomic force microscope suffers from poor accuracy of operation.

SUMMARY OF THE INVENTION

It is, therefore, an object of the present invention to provide a method for analyzing and measuring the surface of a sample based on the flow resistance of a fluid sprayed on the sample in which variations in the movement of the sample are represented as brightness values on a computer screen to obtain a topography of the sample in an easy and simple manner, so that related information can be acquired more accurately and rapidly than by using conventional mechanical probing methods.

It is another object of the present invention to provide an atomic force microscope that is capable of measuring the surface topography of a sample, and even steeply inclined surface portions, and of maximizing the accuracy of related information without any convolution effect due to the shape of a probe.

It is still another object of the present invention to provide an atomic force microscope by which injection and suction of a functional liquid are enabled, thus being applicable to chemical and biological engineering fields.

According to an aspect of the present invention, there is provided a method for analyzing and measuring the surface of a sample, the method comprising spraying a fluid on the surface of the sample and calculating variable values of the flow resistance of the fluid resulting from the collision with the sample surface to measure the surface topography of the sample.

In an embodiment, the method further comprise identifying and determining if a flow resistance value of the fluid colliding with the sample surface is optimal for the measurement of the surface topography of the sample, after the fluid is sprayed on the sample.

In an embodiment, the method further comprises setting the determined optimal flow resistance value to a reference value and moving the sample in the X-Y axes to allow the entire surface of the sample to be scanned, after the flow resistance values are calculated.

In an embodiment, the method further comprises varying the position of the sample in the Z axis together with the X-Y axis movement to adjust varying flow resistance values of the fluid along the irregular surface topography of the sample to the set flow resistance value during scanning, after the sample is moved in the X-Y axes.

In an embodiment, the method further comprises expressing the movement ranges of the sample in the X, Y and Z axes as numerical values and representing the numerical values as brightness values on a computer screen to display the surface topography of the sample, after the sample is moved in the Z axis.

In an embodiment, the optimal flow resistance value is identified and determined by stepwise moving the sample in the Z axis direction, along which the fluid is sprayed, representing enlarged images of the sample surface as brightness values on a computer screen with respect to the respective movement values of the sample, selecting an optimal one from the enlarged images, and setting a flow resistance value corresponding to a movement value having the optimal enlarged image to the optimal value.

In an embodiment, the fluid is a liquid or gas that is likely to deform and is flowable.

According to another aspect of the present invention, there is provided an atomic force microscope using the surface analysis and measurement method, the atomic force microscope comprising: a stage on which a sample is mounted; a nozzle through which a fluid is sprayed on the surface of the sample; a pressure sensor for sensing varying flow resistance values of the fluid depending on the surface topography of the sample after the fluid is sprayed on and collides with the sample surface; a scanner for moving the stage, on which the sample is mounted, in the X, Y and Z axis directions to control the distance between the end of the nozzle, from which the fluid is sprayed, and the sample surface and to enable scanning over the sample surface in order to maintain the varying flow resistance values of the fluid constant after signals are received from the pressure sensor; and an output unit for representing the operational values of the scanner as brightness values on a computer screen to acquire information regarding the surface topography of the sample and flatness, a sectional diagram and a three-dimensional diagram of each portion of the sample and other statistical data.

In an embodiment, the nozzle is vertically supported over the stage by a stand and is constructed so as to receive the fluid supplied at a constant flow rate through a flow valve and spray the fluid on the sample surface.

In an embodiment, the nozzle includes a hollow connecting part directly connected to a line guiding the fluid supplied through the flow valve and a nozzle tip in fluid communication with a distal end of the hollow connecting part and having a hole formed therein to spray the fluid on a microscopic region of the sample surface.

In an embodiment, the nozzle further includes a connecting tube branched from the outer circumference of the connecting part to supply a functional liquid to the connecting part therethrough, and the functional liquid joins the fluid supplied through the flow valve and is sprayed in a limited range on a particular location of the sample surface through the hole of the nozzle tip.

In an embodiment, the atomic force microscope further comprises a pump for creating a vacuum in the connecting tube to extract a target present at a particular location of the sample through the hole of the nozzle tip by a suction force.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
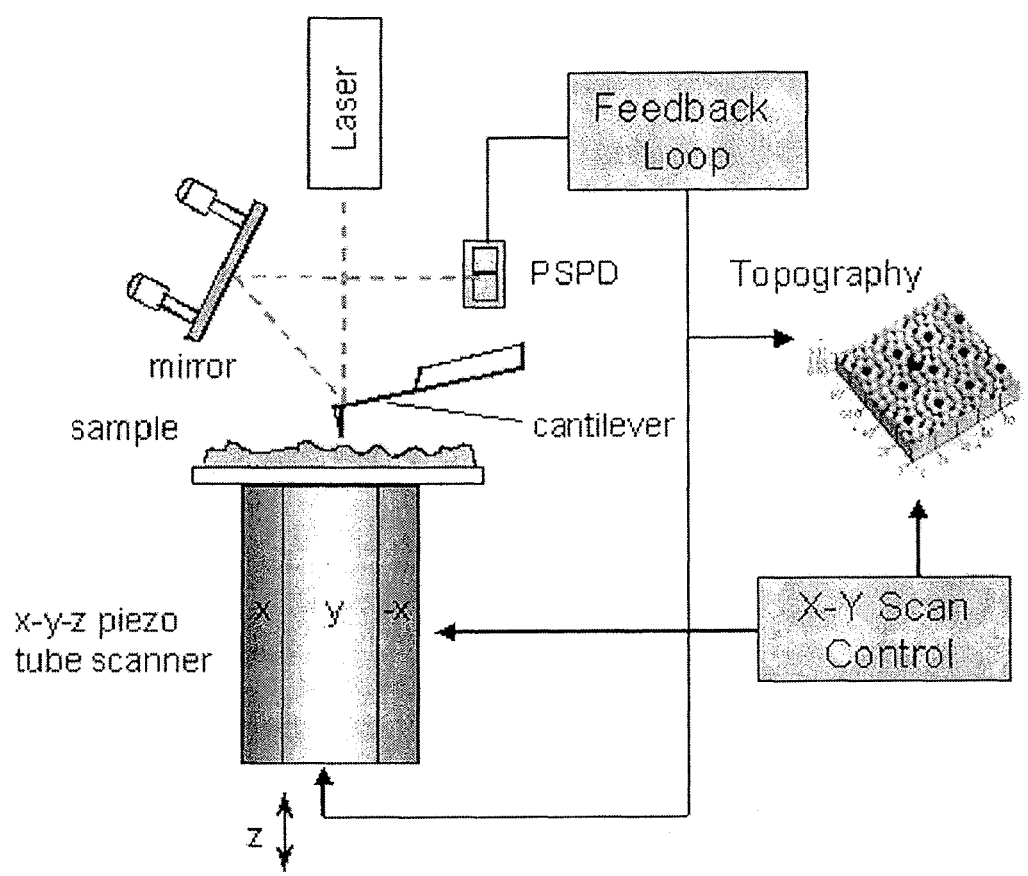
FIG. 1 illustrates a system of a prior art atomic force microscope based on the SPM principle.

Preferred embodiments of the present invention will now be described in detail with reference to the accompanying drawings.

It should be noted that whenever possible, the same reference numerals will be used throughout the drawings and the description to refer to the same or like parts. In describing the present invention, detailed descriptions of related known functions or configurations are omitted in order to avoid making the essential subject of the invention unclear.

Figure 2:
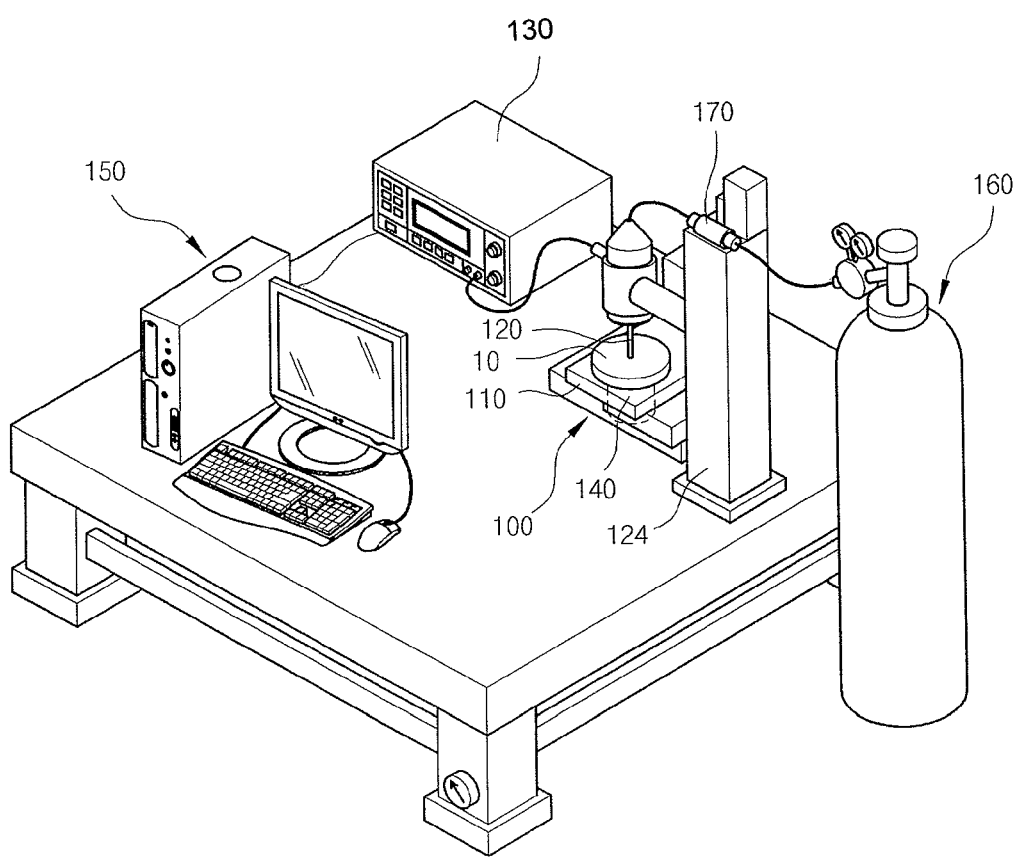
FIG. 2 is a perspective view illustrating a system of an atomic force microscope according to an embodiment of the present invention.
Figure 3:
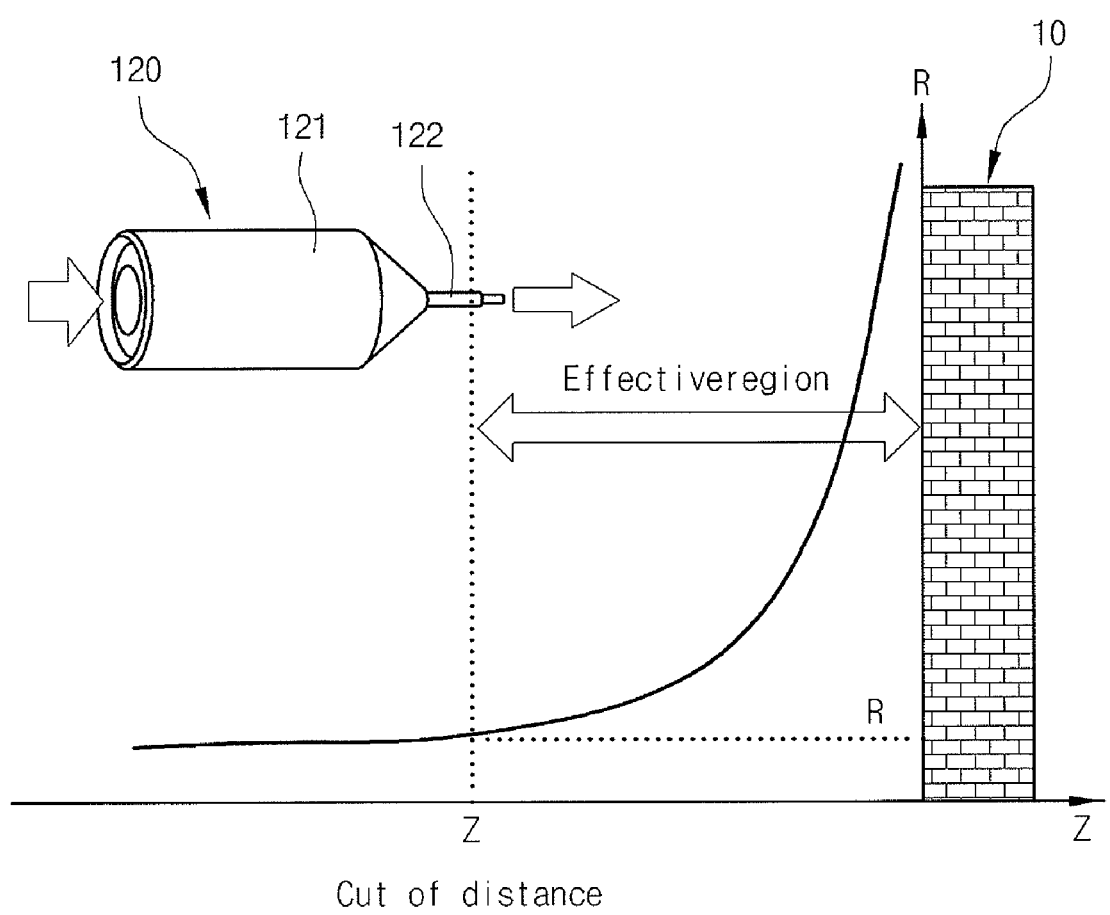
FIG. 3 is a front view for explaining the flow resistance principle of the atomic force microscope of FIG. 2.
Figure 4:
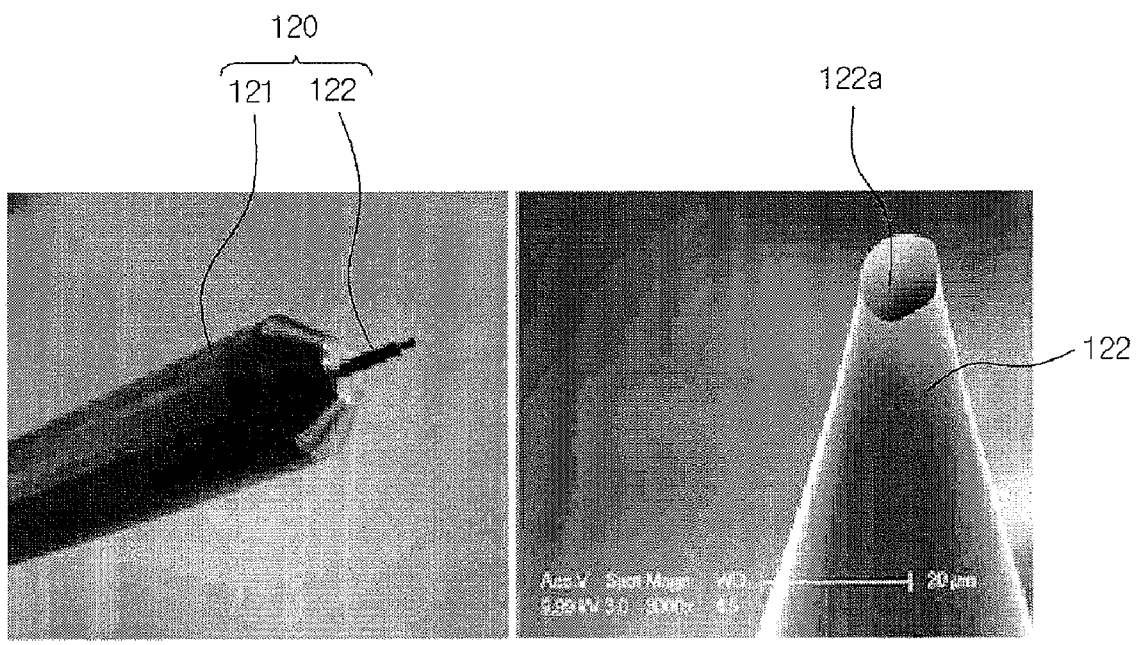
FIG. 4 shows images of a nozzle of the atomic force microscope of FIG. 2.
Figure 5:
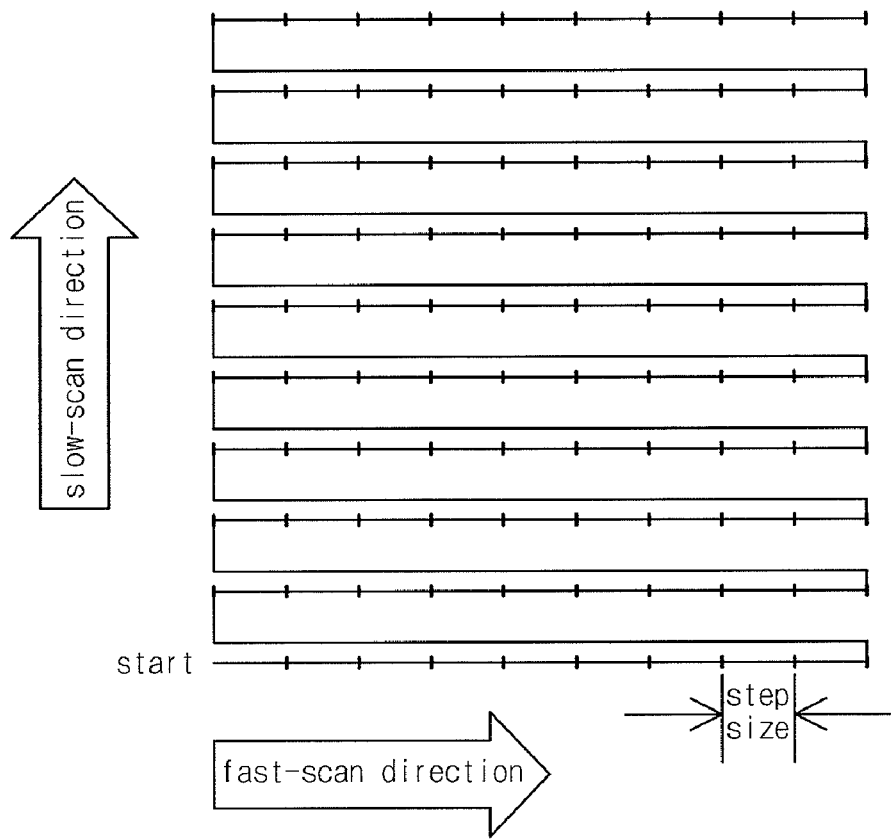
FIG. 5 shows the path of motion of a scanner of the atomic force microscope of FIG. 2.
Figure 6:
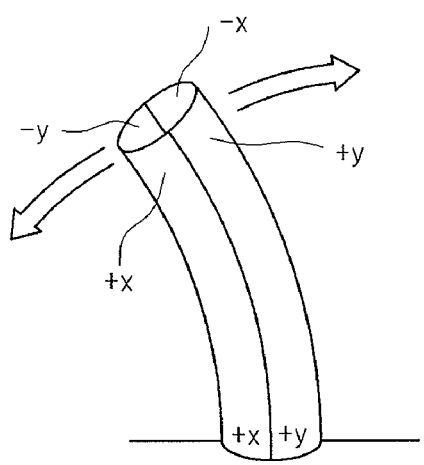
FIG. 6 shows operational states of a scanner of the atomic force microscope of FIG. 2.
Figure 7:
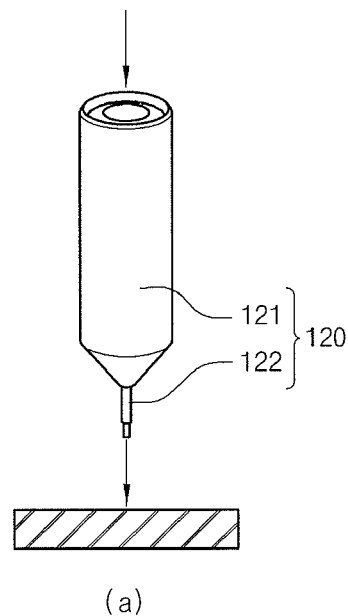
FIG. 7 illustrates the constitutions of atomic force microscopes according to other embodiments of the present invention.
Figure 7:
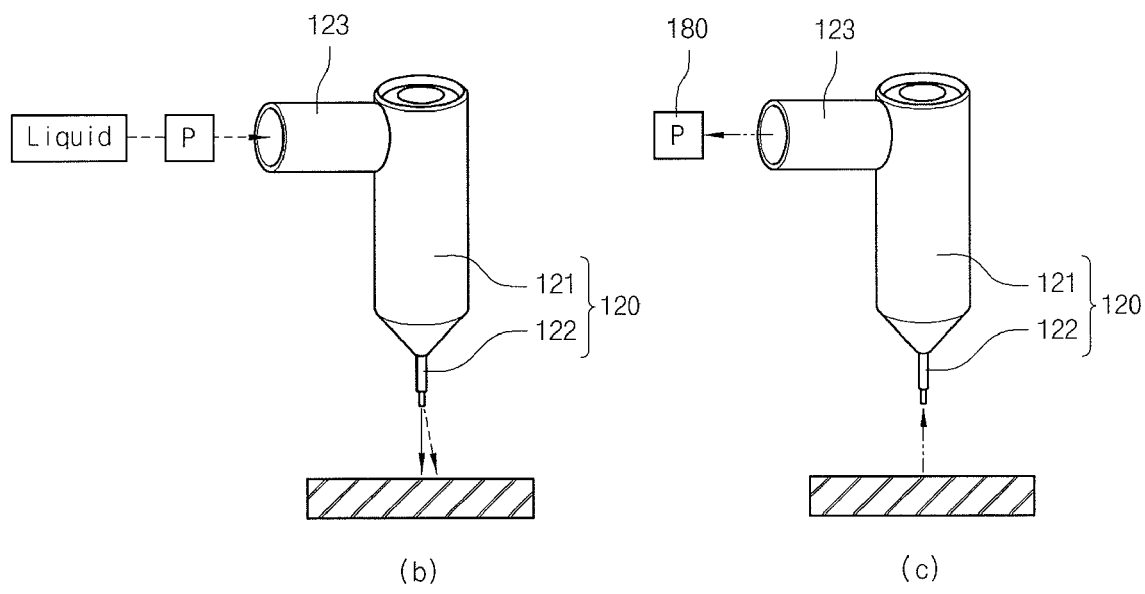
Figure 8:
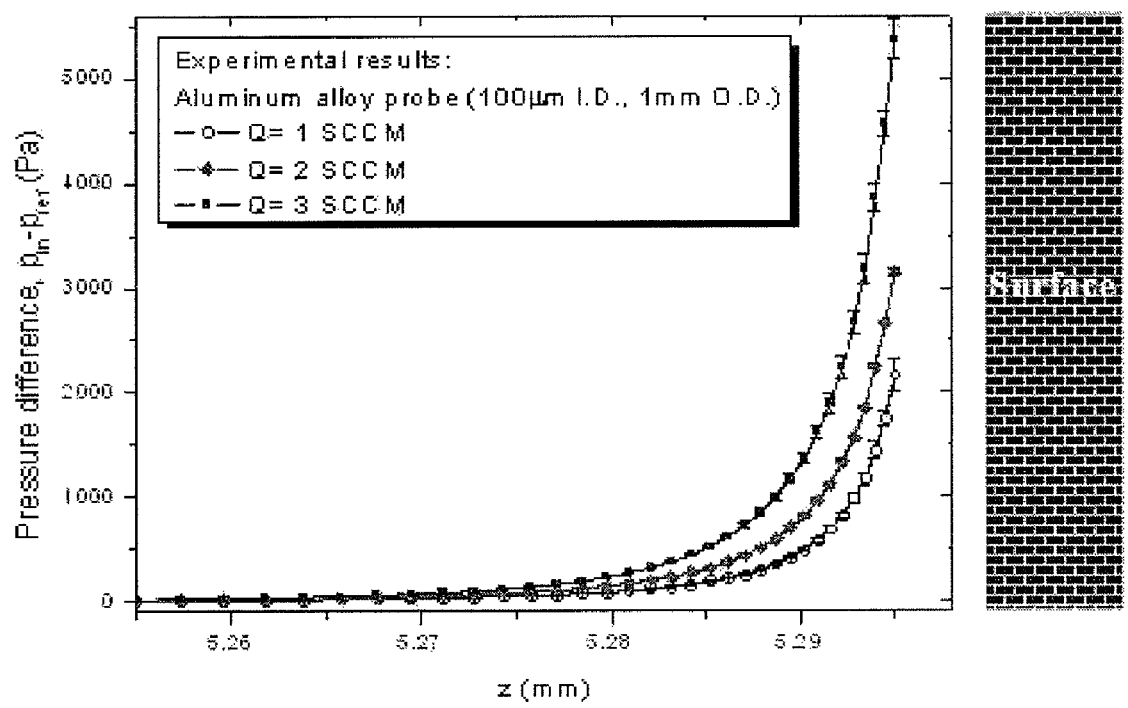
FIG. 8 is a graph showing experimental results obtained using the atomic force microscope of FIG. 2.
Figure 9A:
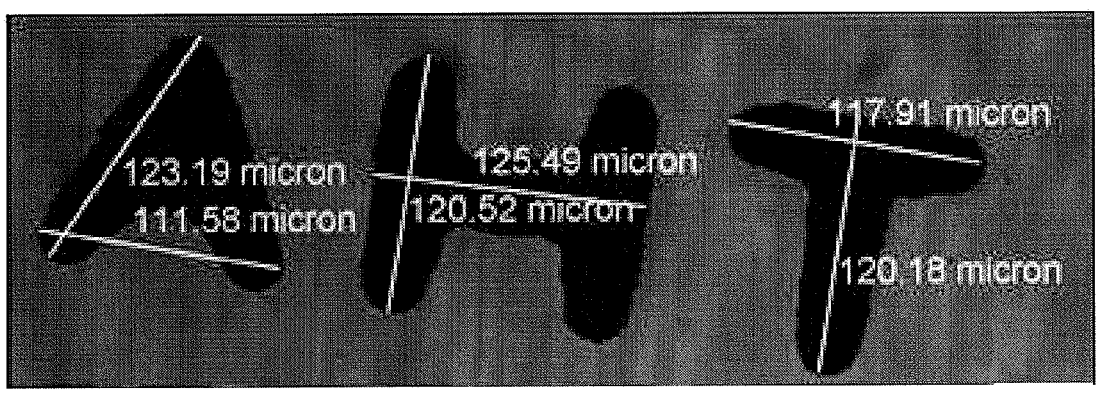
FIGS. 9a and 9b are images showing experimental results obtained using an optical microscope and the atomic force microscope of FIG. 2, respectively.
Figure 9B:
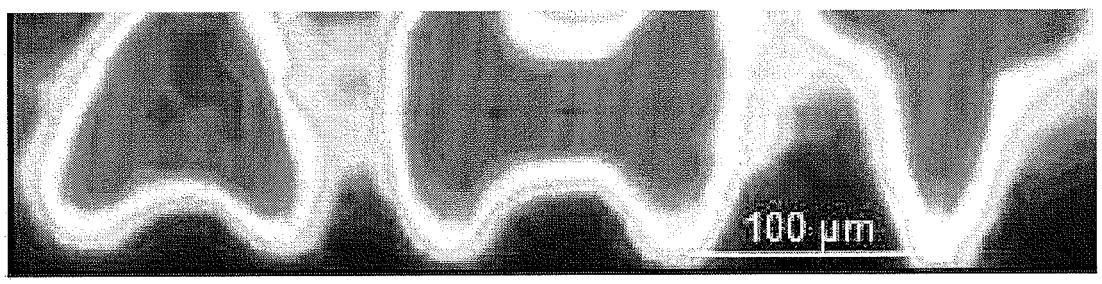

FIG. 1 illustrates a system of a prior art atomic force microscope based on the SPM principle, FIG. 2 is a perspective view illustrating a system of an atomic force microscope according to an embodiment of the present invention, FIG. 3 is a front view for explaining the flow resistance principle of the atomic force microscope of FIG. 2, FIG. 4 shows images of a nozzle of the atomic force microscope of FIG. 2, FIG. 5 shows the path of motion of a scanner of the atomic force microscope of FIG. 2, FIG. 6 shows operational states of a scanner of the atomic force microscope of FIG. 2, FIG. 7 illustrates the constitutions of atomic force microscopes according to other embodiments of the present invention, FIG. 8 is a graph showing experimental results obtained using the atomic force microscope of FIG. 2, and FIGS. 9a and 9b are images showing experimental results obtained using an optical microscope and the atomic force microscope of FIG. 2, respectively.

The present invention provides a method for analyzing and measuring the surface of a sample based on the flow resistance of a fluid. Specifically, the method comprises spraying a fluid on the surface of a sample and calculating variable values of the flow resistance of the fluid resulting from the collision with the sample surface to measure the surface topography of the sample.

The surface analysis and measurement method of the present invention is based on the fluid mechanical principles, unlike conventional atomic force microscopy methods using mechanical probes.

The term "fluid" used herein is intended to include liquids and gases that are deformable, flowable and unshaped.

The use of the fluid in the surface analysis and measurement method enables the measurement of the surface topography of a sample, and even steeply inclined surface portions like narrow and deep valleys, and reduces measurement errors without any convolution effect due to the shape of the probe, thus maximizing the accuracy of related information.

The surface analysis and measurement method of the present invention will be explained below.

First, the fluid is sprayed at a constant flow rate on the surface of a sample. The flow rate is defined as the amount of the fluid flowing per unit time.

This spray causes the fluid to collide with the sample surface to generate flow resistance of the fluid. The flow resistance is expressed as a numerical value and an identification is made on whether the flow resistance value is optimal for the measurement of the surface topography of the sample.

This step is carried out by stepwise moving the sample in the Z axis direction, along which the fluid is sprayed, representing enlarged images of the sample surface as brightness values on a computer screen with respect to the movement values of the sample at the respective steps, selecting an optimal one from the enlarged images, and setting a flow resistance value corresponding to a movement value having the optimal enlarged image to the optimal value.

Thereafter, the sample is continuously moved in a zigzag manner in the X-Y axes while spraying the fluid to allow the entire surface of the sample to be scanned, as illustrated in FIG. 5.

The flow resistance values are varied along the irregular surface topography of the sample during the scanning operation.

That is, the flow resistance values of the fluid is varied by the distance difference between the sample blocking against the spray of the fluid and a nozzle through which the fluid is sprayed according to the topographic parameters (such as flatness and roughness) of the sample.

In order to maintain the identified optimal flow resistance value, the position of the sample is varied in the Z axis together with the X-Y axis movement to adjust varying flow resistance values of the fluid along the irregular surface topography of the sample to the set flow resistance value during scanning.

Thereafter, the movement ranges of the sample in the X, Y and Z axes are expressed as numerical values. Then, the numerical values are represented as brightness values on a computer screen to display the surface topography of the sample.

The present invention also provides an atomic force microscope 100 using the surface analysis and measurement method. Hereinafter, a description will be given of the constitution of the atomic force microscope 100.

The atomic force microscope 100 comprises: a stage 110 on which a sample 10 is mounted; a nozzle 120 through which a fluid is sprayed on the surface of the sample 10; a pressure sensor 130 for sensing varying flow resistance values of the fluid depending on the surface topography of the sample 10 after the fluid is sprayed on and collides with the surface of the sample 10; a scanner 140 for moving the stage 110, on which the sample 10 is mounted, in the X, Y and Z axis directions to control the distance between the end of the nozzle 120, from which the fluid is sprayed, and the surface of the sample 10 and to enable scanning over the surface of the sample 10 in order to maintain the varying flow resistance values of the fluid constant after signals are received from the pressure sensor 130; and an output unit 150 for representing the operational values of the scanner 140 as brightness values on a computer screen to acquire information regarding the surface topography of the sample 10 and flatness, a sectional diagram and a three-dimensional diagram of each portion of the sample 10 and other statistical data.

The nozzle 120 is vertically supported over the stage 110 by a stand 124.

The nozzle 120 receives the fluid from an air tank 160 filled with the fluid under pressure. The fluid is supplied at a constant flow rate to the nozzle 120 through a flow valve 170. The flow valve 170 serves to adjust the pressure of the fluid to a required pressure.

It should be understood that even though air is exemplified as the fluid, there is no limitation on the kind of the fluid.

As shown in FIG. 4, the nozzle 120 includes a hollow connecting part 121 directly connected to a line through which the fluid supplied via the flow valve 170 is transported to maintain the flow rate of the fluid constant and a nozzle tip 122 in fluid communication with a distal end of the hollow connecting part 121 and having a hole 122a formed therein to spray the fluid on a microscopic region of the sample surface.

The hollow connecting part 121 has an inner diameter not larger than 0.1 mm and the hole 122a has an inner diameter of about tens of μm to about tens of nm. The dimension of the hole 122a allows the fluid to be sprayed on a microscopic region of the sample surface along the surface topography of the nanometer-sized sample 10.

The inner diameter of the connecting part 121 is not particularly limited and may be varied depending on the kind of the sample 10 and the flow rate of the fluid.

The operational principle of the atomic force microscope 100 according to the present invention will be explained below with reference to FIGS. 2 and 3.

The nozzle 120 is vertically disposed over the sample 10. The hole 122a is formed so as to penetrate the nozzle 120. The spacing between the end of the hole 122a of the nozzle 120 and the surface of the sample 10 is determined by carrying out the step of identifying the optimal flow resistance value of the surface analysis and measurement method as mentioned above.

Thereafter, the fluid, whose flow rate is maintained constant by the flow valve 170, from the air tank 160 is sprayed on the surface of the sample 10 via the hole 122a of the nozzle tip 122. This spray causes the fluid to collide with the surface of the sample 10 to generate flow resistance of the fluid.

The generation of the flow resistance of the fluid from the inside to the outside of the nozzle 120 requires a difference in pressure between the inside and the outside of the nozzle 120. That is, a constant pressure difference between the inside and the outside of the nozzle 120 is required to obtain a constant flow rate (i.e. a constant amount of the fluid flowing per unit time) of the fluid.

This means the presence of constant flow resistance. In other words, when the fluid flows at a constant rate from the nozzle 120, the pressure difference between the inside and the outside of the nozzle 120 causes the fluid to collide with the surface of the sample 10, thereby generating flow resistance.

Consequently, the closer the distance between the nozzle 120 and the sample 10, the larger the flow resistance, and vice versa.

The flow resistance of the fluid may be varied depending on the surface topography (e.g., relative height, degree of inclination and flatness) of the sample 10.

FIG. 3 graphically shows the flow resistance principle of the atomic force microscope 100. Specifically, $F_{flow}$, which represents the flow resistance of the fluid, increases with decreasing distance between the nozzle 120 and the sample 10 (i.e. with increasing Z). Accordingly, when the fluid is sprayed on the surface of the sample 10 having a certain surface topography (e.g., relative height, degree of inclination and flatness), the flow resistance of the fluid varies depending on the surface topography of the sample 10.

The varying flow resistance is detected and converted into a signal by the pressure sensor 130. The sensed signal moves the stage 110 in the X, Y and Z axis directions corresponding to the varying flow resistance value during scanning so as to maintain the initial flow resistance at the same value.

As such, the pressure sensor 130 senses the varying flow resistance values, converts the flow resistance values into signals, and sends the sensed signals to the scanner 140. The scanner 140 receives the signals to move the stage 110.

In conclusion, the same flow resistance value of the fluid can always be obtained by controlling the movement of the nozzle 120 and the sample 10 in the X, Y and Z axis directions and the distance between the nozzle 120 and the sample 10 corresponding to the varying flow resistance values of the fluid depending on the surface topography of the sample 10.

The output unit 150 expresses the movement values of the sample 10 moving in the X, Y and Z axis directions by the scanner 140 corresponding to the set flow resistance value as numerical values and represents the numerical values as brightness values on a screen. As a result, information can be acquired regarding the flatness, a sectional diagram and a three-dimensional diagram of each portion of the sample 10 and other statistical data.

The scanner 140 is made of a piezoelectric ceramic to scan the sample 10.

Referring to FIGS. 5 and 6, the structure, operation and path of motion of the scanner 140 will be explained below.

The scanner 140 employs a piezoelectric device. The piezoelectric device is structurally simple and mainly cylindrical like a hollow bamboo. Electrode plates are coated on the inner and outer sides of the cylindrical structure. The outer electrode plate is divided into four equal portions (called +x, +y, −x and −y, respectively). The inner electrode plate is an electrode that moves in the Z axis direction. For example, the +x and −x electrode portions swing right and left in the X axis direction in response to an applied alternating voltage, and the +y and −y electrode portions swing forward and backward in response to an applied voltage. The inner electrode plate expands and shrinks in the vertical direction in response to an applied voltage.

An applied voltage deforms the size of the piezoelectric device, and conversely, an applied physical stress induces a voltage between the opposite electrodes. The piezoelectric scanner is designed to move the piezoelectric device in the X, Y and Z axis directions.

The use of the atomic force microscope 100 according to the present invention gives the following experimental results.

FIG. 8 is a graph showing the surface topography of the sample 10. At this time, the nozzle tip 122 has an inner diameter of 100 μm and an outer diameter of 1 mm.

As expected earlier, when the nozzle tip 122 comes close to the sample 10, the pressure difference is varied by the sample surface at a particular distance (cut-off distance: about 5.27-5.28 mm). The graph shows that when the distance between the nozzle tip 122 and the sample 10 is shorter than the cut-off distance, the pressure increases sharply.

The horizontal Z axis shows relative distance. That is, 5.27, 5.28, etc. in the graph are not absolute values. More importantly, the flow resistance begins to vary from a particular distance (about 5.27), and thereafter, the flow resistance is continuously varied until the distance reaches about 20 μm.

The graph shows that as the rate of the fluid flowing between the nozzle tip 122 and the sample 10 increases from 1 SCCM to 3 SCCM, the cut-off distance influenced by the surface of the sample 10 increases and the operation region of the atomic force microscope is widened. The term 'SCCM' used herein is an abbreviation for Standard Cubic Centimeter per Minute (1 SCCM=$(10^{-2}$ m$)^{-3}$/60 s=$10^{-6}$/60 m$^3$/s). The graph also shows that an increase in the pressure of the fluid per unit distance leads to an improvement in the sensitivity of the atomic force microscope.

Conventional atomic force microscopes based on the SPM principle have an operational distance shorter than about 10 nm, while conventional atomic force microscopes based on the scanning tunneling microscope (STM) principle have an operational distance of about 1 nm, which corresponds to the size of one or two atoms. In contrast, the atomic force microscope 100 of the present invention has a long operational distance because the interaction forces of the atomic force microscope 100 are generated by a flow of a fluid. In addition, the operational distance of the atomic force microscope 100 increases with increasing flow rate of the fluid.

These results lead to the conclusion that the atomic force microscope 100 of the present invention can be used as an instrument for measuring the surface topography of a sample.

FIG. 9a shows the shape and dimension of a pattern formed by micromachining, as measured using an optical microscope. FIG. 9b shows measurement results of the pattern using the atomic force microscope of the present invention (the inner diameter of the nozzle tip 122=15 μm). The shape of the pattern is clearly observed in FIG. 9b.

FIGS. 7b and 7c illustrate the constitutions of atomic force microscopes according to other embodiments of the present invention.

Numerous embodiments of the small-sized nozzle tip 122 through which a fluid is sprayed on a sample are possible, in addition to embodiments of the output unit 150 for displaying the surface topography of the sample 10.

According to the first embodiment shown in FIG. 7b, the nozzle 120 further includes a connecting tube 123 branched from the outer circumference of the connecting part 121 to supply a functional liquid to the connecting part 121 therethrough. The functional liquid joins the fluid supplied through the flow valve 170 and is sprayed in a limited range on a particular location of the sample surface through the hole of the nozzle tip 122.

For example, the functional liquid may be a coating liquid or a liquid chemically reacting with the sample 10. The fluid provided to measure the surface of the sample 10 joins the functional liquid in the nozzle 120. The pressure of the fluid allows the functional liquid to be sprayed on a particular portion of the sample surface in a limited range. Therefore, the functional liquid can be accurately sprayed on a particular location of the sample 10 having a fine topography on a nanometer scale. This embodiment can further extend the applicability of the atomic force microscope 100.

According to the second embodiment shown in FIG. 7c, the atomic force microscope 100 further comprises a pump 180 for creating a vacuum in the connecting tube 123 in a state in which the functional fluid and the liquid are not sprayed through the nozzle 120, to extract a target molecule present at a particular location of the sample 10 through the hole 122a of the nozzle tip 122 by a suction force.

This embodiment can be applied to microbiological fields, such as cloning, which is being developed at present.

Treatment of biological cells is important in microbiology.

Injection of particular DNA into cell nuclei is gaining more importance. It takes a long time for a researcher to acquire a manual technique for injecting biological cells. Further, the results are greatly affected by the skill of the researcher.

Furthermore, the manual injection increases the possibility of cell contamination, resulting in low reproducibility. Thus, there is a need for a mechanical method that can increase the possibility of success in cell injection in a repeatable manner, like the method of the present invention.

The first embodiment enables the finding of a particular cell in a sample and the extraction of the cell from the sample through the nozzle tip 122 by the suction force of the pump 180 installed in communication with the connecting tube 123 branched from the nozzle 120.

The second embodiment enables accurate injection of a particular cell into a particular location of the sample 10. Specifically, the cell is injected into the nozzle 120 through the connecting tube 123 and is sprayed on a particular location of the sample 10 through the hole 122a of the nozzle tip 122 by the pressure of the fluid.

Particularly, by using the atomic force microscope 100, specific surface topographic data, for example, flatness, sectional diagrams and three-dimensional diagrams, of a sample can be obtained, and a particular cell can be extracted from a sample or a cell can be injected into a particular location of a sample.

As is apparent from the above description, according to the surface analysis and measurement method of the present invention, a surface topography of a sample can be obtained in an easy and simple manner due to the use of a fluid that is deformable, flowable and unshaped. Therefore, related information can be acquired more rapidly and accurately than by using conventional mechanical probing methods. Further, improved ease of operation is provided.

In addition, the use of a fluid in the atomic force microscope of the present invention enables the measurement of the surface topography of a sample, and even steeply inclined surface portions like narrow and deep valleys, and reduces measurement errors without any convolution effect due to the shape of the probe, thus maximizing the accuracy of related information.

Furthermore, the atomic force microscope of the present invention can precisely spray a functional liquid on a particular location of a sample or extract a particular cell from a biological sample while identifying the surface topography of each sample. Therefore, the applicability of the atomic force microscope according to the present invention can be effectively extended based on the fluid mechanical principle.

Although the present invention has been described herein with reference to the foregoing embodiments and accompanying drawings, the scope of the present invention is not limited to the embodiments. Therefore, it will be evident to those skilled in the art that various substitutions, modifications and changes are possible, without departing from the spirit of the invention as disclosed in the accompanying claims.

What is claimed is:

1. A scanning probe microscope comprising:
   a stage on which a sample is mounted;
   a nozzle having a tip with a hole through which a fluid is sprayed on the surface of the sample;
   a pressure sensor for sensing varying flow resistance values of the fluid depending on the surface topography of the sample after the fluid is sprayed on and collides with the sample surface;
   a scanner for moving the stage, on which the sample is mounted, in the X, Y and Z axis directions to control the distance between the end of the nozzle, from which the fluid is sprayed, and the sample surface and to enable scanning over the sample surface in order to maintain the varying flow resistance values of the fluid constant after signals are received from the pressure sensor; and
   an output unit for representing the operational values of the scanner as brightness values on a computer screen to acquire information regarding the surface topography of the sample and flatness, a sectional diagram and a three-dimensional diagram of each portion of the sample and related statistical data,
   wherein the nozzle further includes a connecting tube branched from the outer circumference of a connecting part to supply a functional liquid to the connecting part therethrough, and the functional liquid joins the fluid supplied through a flow valve and is sprayed in a limited range on a particular location of the sample surface through the hole of the nozzle tip, and
   wherein said pressure sensor generates variable values of the flow resistance of the functional liquid resulting from the collision of the liquid with the sample surface and provides the values to the output unit to represent the surface topography of the sample.

2. The scanning probe microscope of claim 1, wherein the output unit expresses movement ranges of the sample in the X, Y and Z axes as numerical values and represents the numerical values as brightness values on a computer screen to display the surface topography of the sample, after the sample is moved in the Z axis.

3. The scanning probe microscope of claim 1, wherein the output unit identifies an optimal flow resistance value and determines by stepwise moving the sample in the Z axis direction, along which the fluid is sprayed, represents enlarged images of the sample surface as brightness values on a computer screen with respect to the respective movement values of the sample, selects an optimal one from the enlarged images, and sets a flow resistance value corresponding to a movement value having the optimal enlarged image to the optimal value.

4. The method of claim 1, wherein the fluid is a deformable or flowable liquid or gas.

5. The scanning probe microscope of claim 1, wherein the nozzle is vertically supported over the stage by a stand and is constructed so as to receive the fluid supplied at a constant flow rate through a flow valve and spray the fluid on the sample surface.

6. The scanning probe microscope of claim 1, further comprising a pump for creating a vacuum in the connecting tube to extract a target present at a particular location of the sample through the hole of the nozzle tip by a suction force.

7. The scanning probe microscope of claim 1 wherein the connecting part is hollow and has an inner diameter not larger than 0.1 mm and the hole has an inner diameter of about tens of um to about tens of nm.

* * * * *